Feb. 25, 1964     D. A. MEEKER ET AL     3,122,235
CONVEYOR STRUCTURE FOR A DISHWASHER
Filed April 22, 1960     6 Sheets-Sheet 5
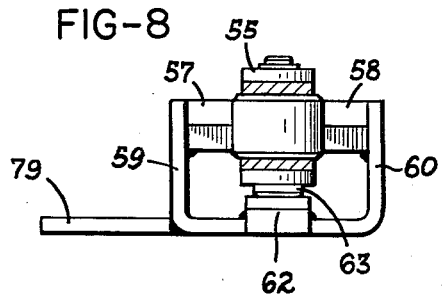
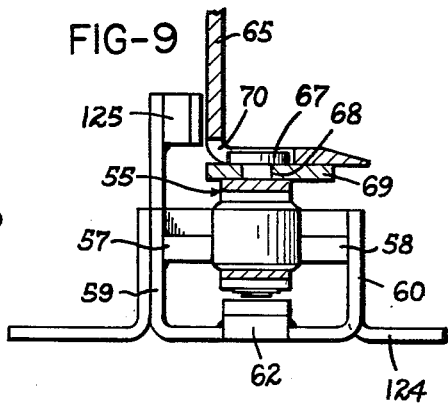
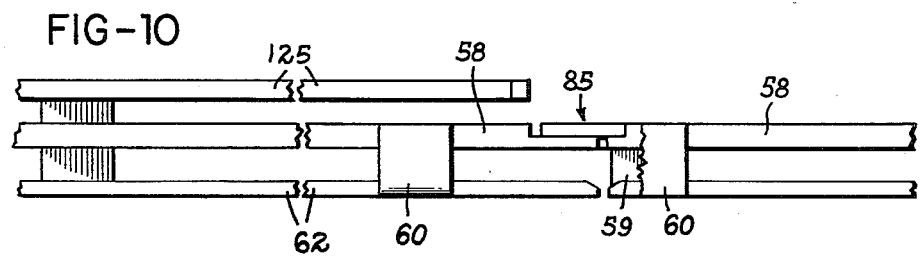
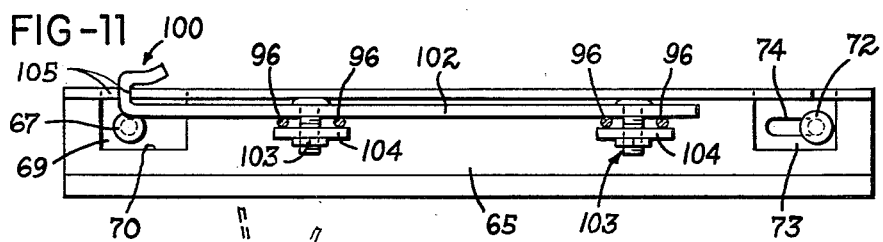
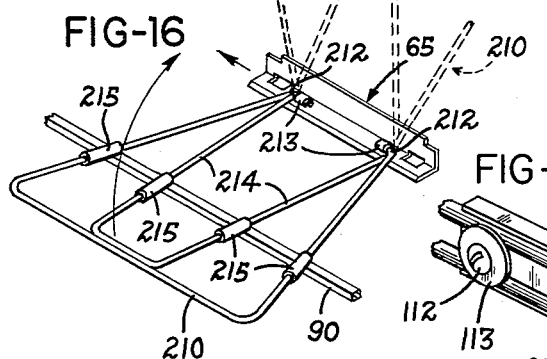
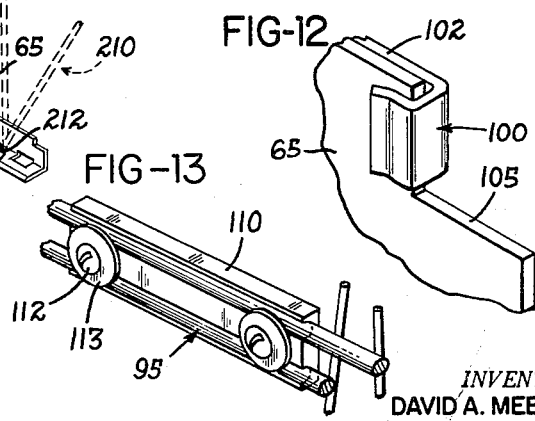
INVENTORS
DAVID A. MEEKER,
GERALD B. FOX &
DONALD E. VANDEVEER
BY Marchal, Biebel, French & Bugg
ATTORNEYS Feb. 25, 1964 D. A. MEEKER ET AL 3,122,235
CONVEYOR STRUCTURE FOR A DISHWASHER
Filed April 22, 1960 6 Sheets-Sheet 6
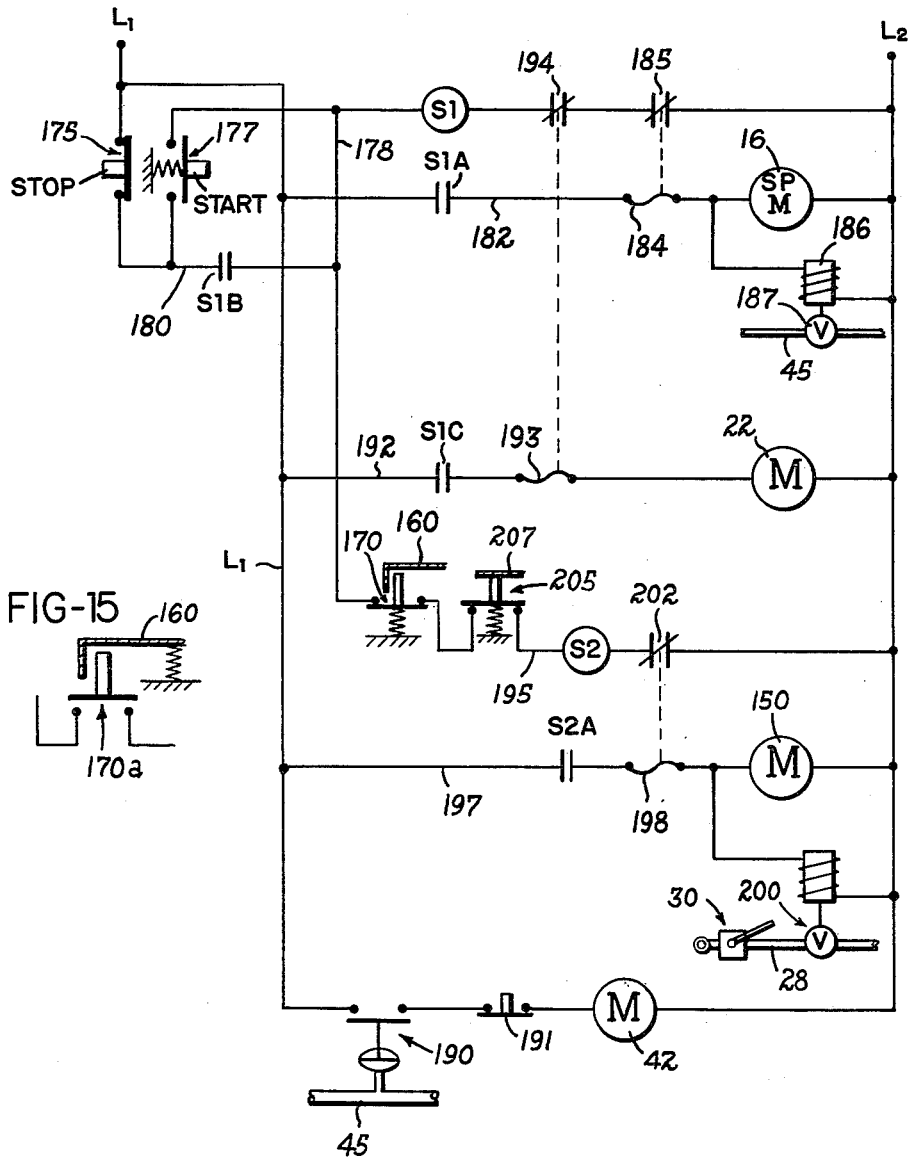
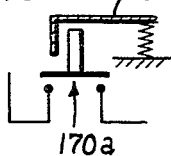
INVENTORS
DAVID A. MEEKER,
GERALD B. FOX &
DONALD E. VANDEVEER
BY *Marechal, Biebel, French & Bugg*
ATTORNEYS United States Patent Office 3,122,235
Patented Feb. 25, 1964

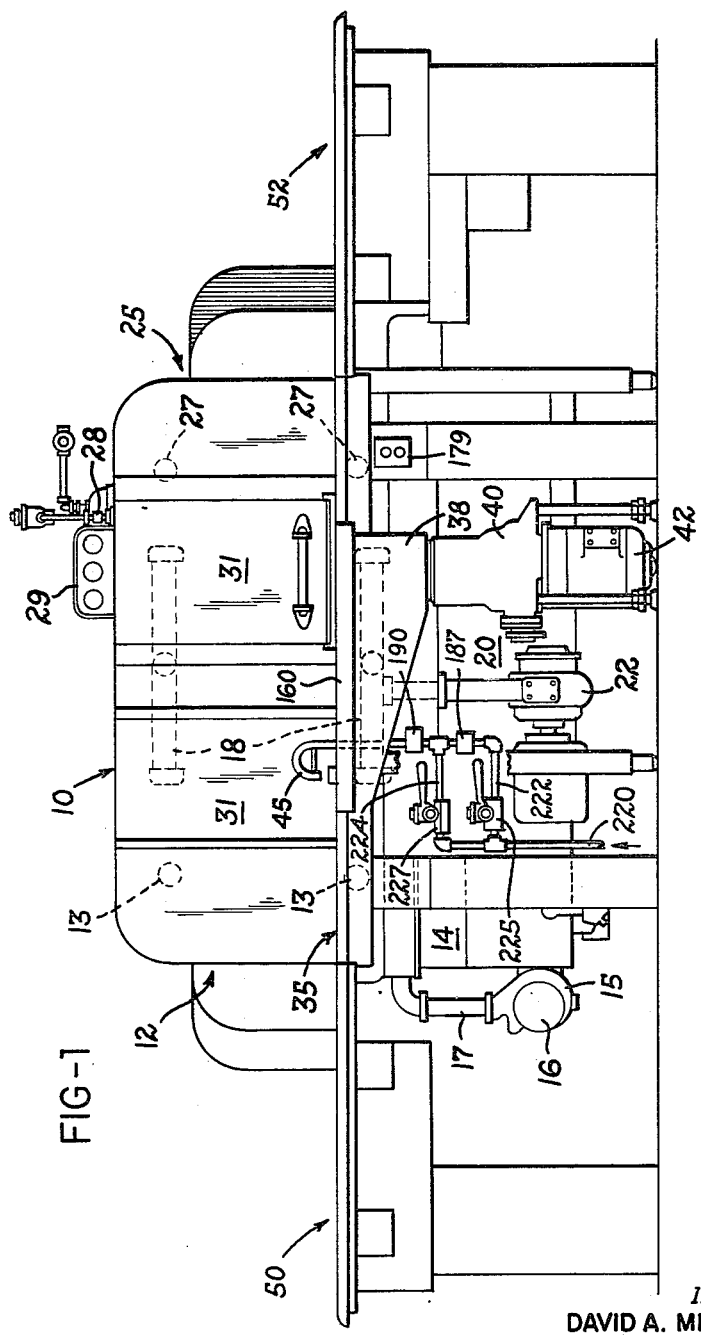

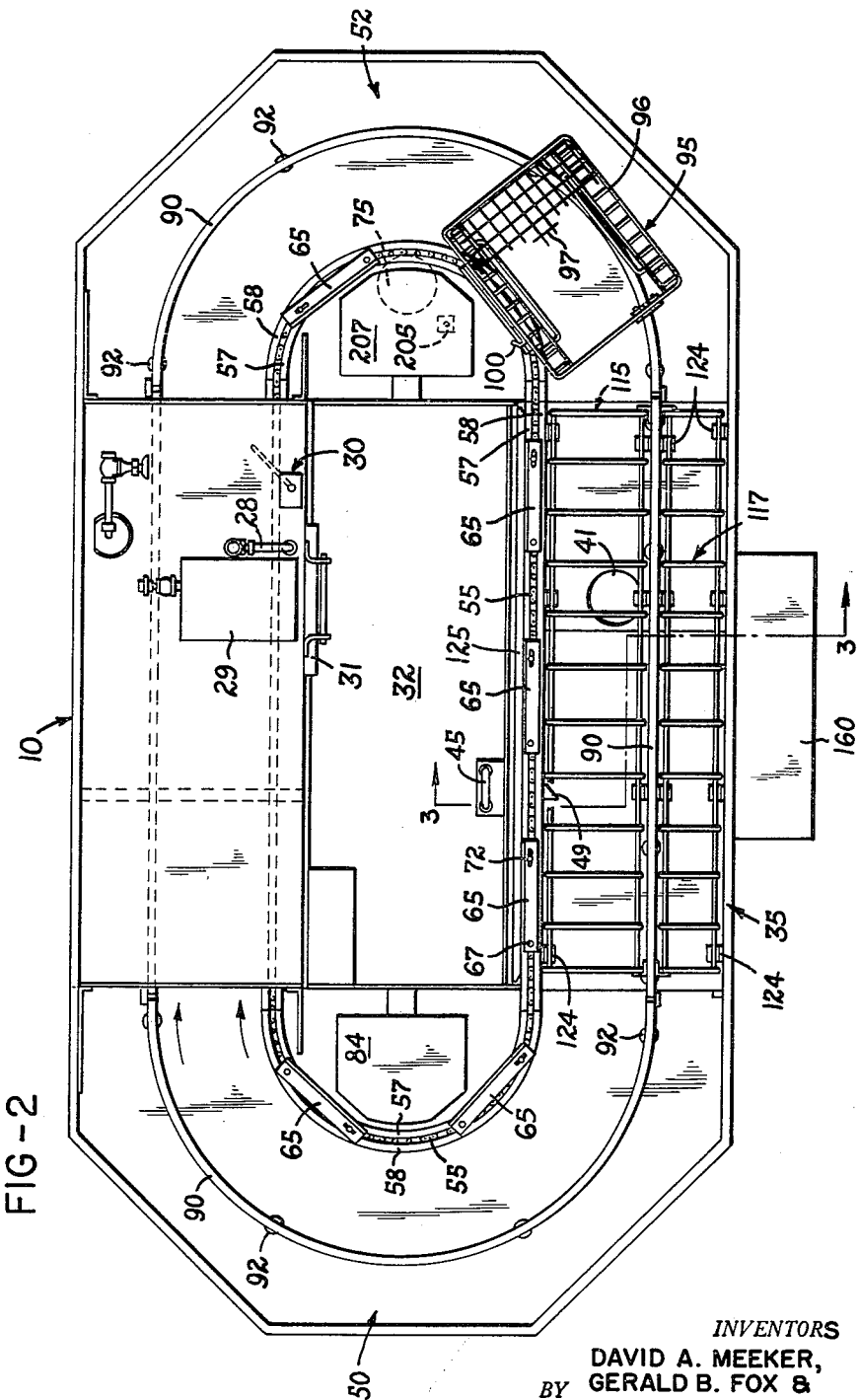

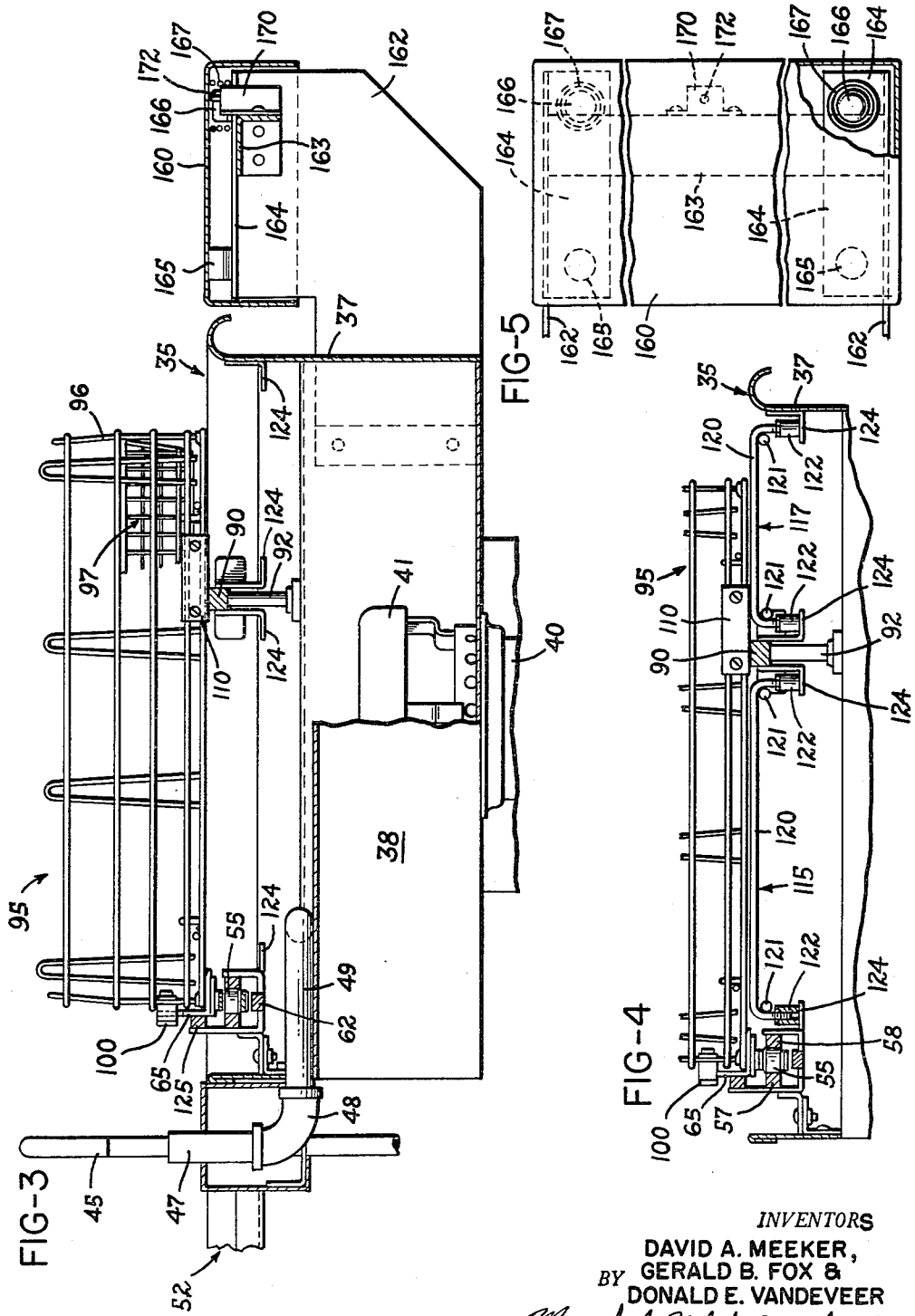

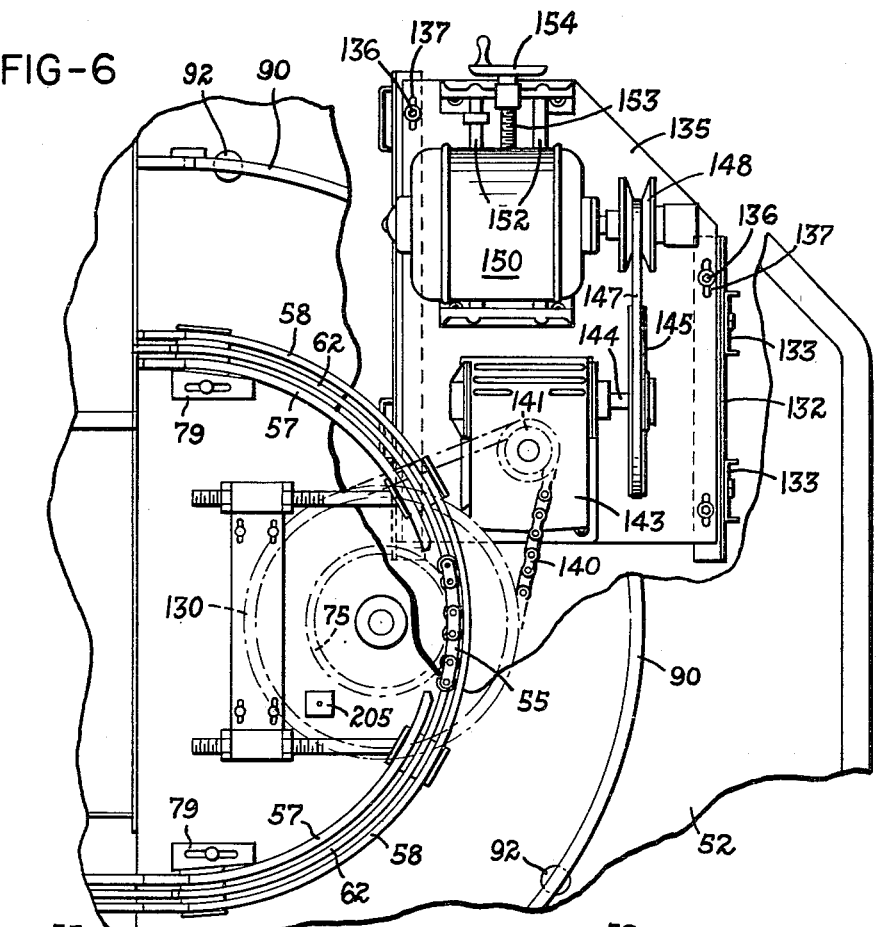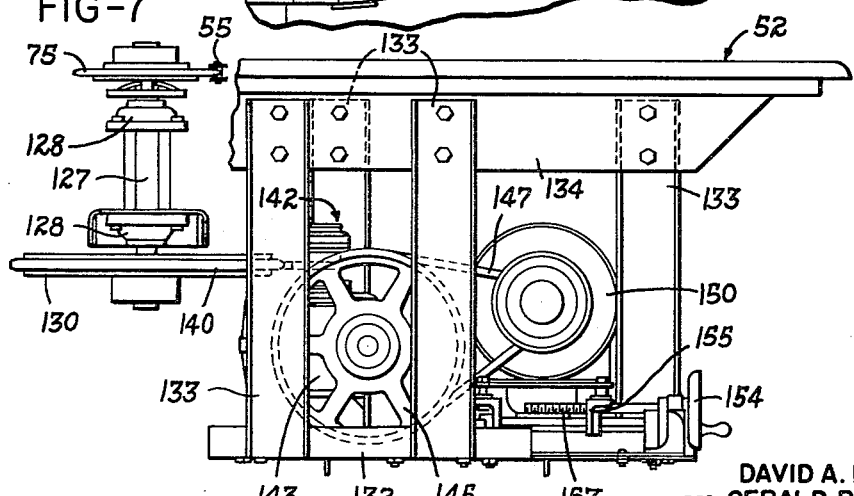

3,122,235
CONVEYOR STRUCTURE FOR A DISHWASHER
David A. Meeker, Gerald B. Fox, and Donald E. Vandeveer, Troy, Ohio, assignors to The Hobart Manufacturing Company, Troy, Ohio, a corporation of Ohio
Filed Apr. 22, 1960, Ser. No. 23,986
4 Claims. (Cl. 198—181)

This application relates to dishwashing machines, particularly to a high capacity type of machine in which racks or the like for carrying soiled dishes may be circulated in a closed horizontal path through dishwashing apparatus.

In accordance with the invention a dishwashing machine of this type may be used with a fixed number of racks circulated through the machine and maintained in the circulating path, while soiled dishes are loaded into the racks before they pass through the washing apparatus, and the clean dishes are removed following washing. The same machine can be used in an arrangement where the racks are loaded with soiled dishes at some station remote from the machine, and the racks then placed into the driving or conveying mechanism of the machine. The coupling of the racks to the conveying mechanism may be the same for either arrangement, but when the racks are to be engaged and disengaged from the conveying mechanism it is most desirable to effect this coupling and uncoupling without lifting the loaded racks, either onto or away from the machine.

While such a machine can be used in either of the foregoing arrangements, in either case the washing apparatus includes a power spray wash mechanism and a final rinse spray which uses fresh hot water. Since this final rinse water is used fresh from the tap and in considerable volume, and since considerable power is required to heat this final rinse water to the necessary relatively high temperature, it is advisable to control the use of the final rinse spray in such a way that no more of the final rinse water is used than is necessary.

Therefore, it is customary to actuate the final rinse spray in accordance with passage of dishes thereby, and one convenient arrangement for this purpose may embody a lever or the like to be moved by racks passing through the washing apparatus and connected to open a valve in the final rinse spray system. However, if a rack stops at this position, either by accident or due to deliberate stopping of the conveying device for some control reason, the fresh water rinse will continue with considerable waste in power and fresh water.

Accordingly, a primary object of this invention is to provide a novel conveyor structure, particularly for use in a dishwashing machine, said conveyor structure having an endless conveyor for carrying racks of soiled dishes and the like through washing apparatus, and wherein provisions are made to engage and disengage the racks from the conveying device by sliding movement only, avoiding the need to lift the racks to obtain a driving engagement thereof with the conveying device.

Another object of this invention is to provide such a machine wherein ordinary dish carrying racks may be conveniently used without the need for special transporting equipment or the like to carry the racks through the washing apparatus.

An additional object of this invention is to provide an endless conveyor arrangement for a dishwashing machine including dish carrying racks wherein the turns in the conveying system are of a relatively large radius minimizing the acceleration and deceleration forces on the racks and dishes carried therein.

Another object of this invention is to provide an automatic control for the drive of the conveying device and for the supply system of the final rinse spray, which control may be connected for continuous operation of the conveying device, and continuous circulation of racks engaged therewith and to stop the conveying device when a tray of soiled dishes is in position on the machine for loading into an empty rack.

A further object of the invention is to provide such a control which may alternately be connected for operation of the conveying device and the final rinse only when soiled dishes are positioned on the machine for loading, and to override the rack-controlled valve in the final rinse spray in the event that the conveying device is stopped with a rack adjacent the final rinse spray device.

Other objects and advantages of the invention will be apparent from the following description, the accompanying drawings and the appended claims.

In the drawings—

FIG. 1 is a side elevational view of a dishwashing machine in accordance with the invention, showing the overall arrangement thereof;

FIG. 2 is a plan view of the machine showing one rack in position and showing the rack slide grid over the scraping basin;

FIG. 3 is a sectional view on a larger scale, taken on line 3—3 of FIG. 2, but with the rack supporting grid removed;

FIG. 4 is a view similar to FIG. 3, showing the grid in position;

FIG. 5 is a partially broken away plan view of a tray supporting and actuating control platform as shown in FIG. 3;

FIGS. 6 and 7 are, respectively top and side elevational views of the drive mechanism for the rack conveying device;

FIG. 8 is a detail sectional view through a portion of the conveying device and guides therefor;

FIG. 9 is a view similar to FIG. 8 illustrating a portion of one of the towing brackets or lugs which are carried by the conveying mechanism, and also illustrating cooperation of a back-up rail with such brackets;

FIG. 10 is a broken elevational view of a portion of the back-up rail which supports the conveying lugs or brackets against the thrust of a rack being engaged therewith;

FIG. 11 is a detail view of one of the brackets on the conveying device and a portion of an engaging hook which is mounted on each of the racks used in the machine;

FIG. 12 is a detail view of the manner in which a rack hook is engaged with a towing bracket;

FIG. 13 is a detail view showing the manner in which a slide pad is mounted on a dish carrying rack;

FIG. 14 is a schematic diagram of an electrical control system for the machine;

FIG. 15 is a diagram of a modification for the circuit of FIG. 14; and

FIG. 16 is a somewhat diagrammatic perspective view of a modified form of conveyor.

Referring to the drawings, which illustrate preferred embodiments of the present invention, and particularly with reference to FIGS. 1 and 2, the dishwashing machine includes the dishwashing apparatus which may be of conventional construction and includes a housing 10 of generally elongated shape having an entrance end 12 in which there may be a power scrapping spray apparatus indicated generally at 13, including a tank 14 and a pump 15 (driven by motor 16) which is connected through suitable conduits 17 to recirculate water from the tank 14 through the scrapping sprays 13.

Within the central portion of the cabinet or housing 10 is the main power spray washing apparatus, indicated by the upper and lower spray heads 18. These heads are located over the main tank 20 which contains a quantity of wash water during operation, and this water is recirculated from the tank through the spray heads 18 by a power driven pump 22. The exit end 25 of the dishwashing apparatus houses the final rinse spray heads 27, and these heads are supplied from a fresh water line 28 which is connected directly to a water line or tap. This final rinse water is heated to a relatively high temperature, either by an electric booster heater or by a gas or steam heater (not shown), depending upon the source of power available. The usual final temperature of this water is in the neighborhood of 180° F. Gages for showing the temperatures are mounted within a small housing 29 on the top of the main cabinet.

The operation of the final rinse spray is controlled by an arm operated valve 30 connected in line 28. This valve is normally closed, and opens when a rack pushes the arm to one side, thus providing a final rinse spray only when a rack is located at this position.

The main cabinet 10 is provided with sliding access doors 31 which may be raised manually for access to the interior of the dishwashing apparatus, as for maintenance and repair purposes. In the present machine these doors are reached through a central aisle or open space, indicated at 32 in FIG. 2, and on the opposite side of this aisle is an elongated table 35 which preferably is of approximately the same length as the dishwashing apparatus. This table includes a scrapping basin or sink 38 which may have a garbage grinder or disposer 40 connected to its outlet under a protective cover 41, and driven by motor 42. In localities where disposers are not permitted, the basin may incorporate standard waste collecting trays over its outlet.

It will be noted that the bottom surface of the basin 38 slopes downwardly toward the disposer, and when the disposer is in operation water is continually supplied to the basin, and flowed over this sloping surface thereof through a supply line 45 which is directed through an anti-siphon connection 47 (FIG. 3) and thence through elbow 48 and a distributor pipe 49 into the basin at the higher end thereof. The anti-siphon connection includes the usual air space, as best seen in FIG. 1, which prevents the supply line 45 from withdrawing water from the basin in the event that a negative pressure should ever exist in the supply line.

The entrance and discharge ends of the dishwashing apparatus are connected to the opposite ends of table 35 by extension tables 50 and 52, respectively. These tables form a substantially flush continuance of the table 35 directly to the dishwashing apparatus, and are provided with a continuous surface such that any water dripping from the dishes either in loading or unloading from the dishwashing cabinet will be directed back either to the table 35 and thence into the basin 38, or into one of the tanks of the dishwashing apparatus.

Thus, the present machine provides a closed circuit for movement of dish carrying racks in a generally horizontal loop path through the machine. A continuous conveyor extends along this path, at the inner edge preferably, and is provided by an endless chain 55 which extends between parallel guide rails 57 and 58 provided on the table 35 and also on the extensions 50 and 52, thus guiding the chain around the curves at the end of the loop and along the straight flight over the rear edge of table 35. The relationship of the conveyor chain and these rails is shown in greater detail in FIGS. 3, 4, 8 and 9, wherein the rails 57 and 58 are shown as mounted on corresponding angle pieces 59 and 60, respectively. These pieces are joined at their horizontal legs through a lower supporting rail 62 on which the heads of the chain link pins 63 are slidably supported when the conveyor is in operation.

The conveyor is provided with a plurality of towing lugs or bracket members 65, each of which is of generally L-shape in cross-section, as shown particularly in FIGS. 3 and 9, and each of which is carried on the conveyor chain 55 by a forward bolt or pin 67, which actually may be an elongated and inverted pin of the conveyor chain. This forward bolt or pin is received through a complementary hole 68 (FIG. 9) formed in a coupling plate or strip 69 which is secured to the underside of the lug or bracket 65, beneath an opening 70 formed therein to accommodate the head of the pin 67 in flush relation. The rearward end of the bracket is fastened to the conveyor chain in a similar manner, through an elongated pin 72, but the coupling plate or strip 73 in this case is provided with an elongated slot 74 which provided for sufficient relative movement between pin 72 and the bracket or towing lug to accommodate the shortening of the chordal distance between pins 67 and 72 when the chain is passing around the curved ends of the loop.

The conveyor chain is moved by a driving sprocket 75 (FIGS. 2, 6 and 7), which is mounted in the extension table 52 to mesh with at least one link of the conveyor chain, as shown particularly in FIG. 6. The chain is guided into mesh with the drive sprocket by the outer curved section of guide rail 58 and the inner guide rails 57, the latter having an opening through which the sprocket 75 extends. These sections of rail preferably are mounted on adjustable lugs 79 such that the precise position thereof may be obtained after the conveyor chain is placed therein.

At the other end, on the extension table 50, are similar though continuous, sections of outer and inner guide rails 58 and 57 which are adjustably supported on a mounting member shown generally at 84. This member may also be moved to a limited degree upon the extension table 50, to adjust and to maintain the precise position of the guide rails, and thus of the conveyor chain. The flight of the chain passing through the dishwashing apparatus is guided by the same type of three rail support. Thus, to facilitate the movement of the conveyor chain 55 into and out of the curved guide rails at the ends of the loop, the ends of these rails are beveled, such that any protruding parts of the drive lugs or brackets 65 will be readily guided over the surface of these rails. Likewise, where the curved sections of rails 57 and 58 intersect the front straight sections, these parts include overlapping ends 85 (FIG. 10) which provide an essentially continuous support structure and also permit sufficient longitudinal movement between these rails to accommodate adjustment.

Outwardly of the conveyor chain, parallel thereto and preferably somewhat beyond the center of the tables and the dishwashing apparatus, is a monorail structure in the form of appropriately straight and curved rods or straps 90 which are mounted on short pedestals 92. In the construction illustrated there are four such rods, the front and back straight sections, and the curved sections on the extension tables 50 and 52. This monorail structure provides a sliding support for the dish carrying racks as they are moved around the closed circuit loop of the machine. These straps likewise include overlapped ends at their joints which provide for adjustment of the length thereof.

The machine is adapted to operate with conventional dish carrying racks, such for example as shown in Patent No. 2,804,213, and one of which is indicated by the general reference numeral 95 in FIGS. 2 and 3. This rack structure includes an outer main member 96 which may preferably be formed of stainless steel wire or the like and an inner or insert member 97 which is fitted into the main rack structure and becomes essentially a permanent part thereof during use.

Different types of inserts 97 may be provided for different functions, for example a close mesh insert may be used to provide a rack for carrying silverware, a different insert having upwardly projecting fingers may be used for dishes, cups, glassware, etc. While these inserts are interchangeable between the main rack structure 96, they are used as an essentially permanent part thereof and are maintained in the rack at all times when dishes are carried therein, since it is normally not the function of the inserts to provide a removable dish or silverware carrying member independent of the rack.

Each of these racks is provided with a towing hook 100, details of which are shown particularly in FIGS. 11 and 12. This hook is provided by a strap-like piece of metal 102, such as stainless steel, which is secured to the wire structure of the rack 96 by suitable bolt and nut fasteners 103 and corresponding washers 104. The hook is formed outwardly and opens laterally along a side of the rack, and is adapted to engage around the towing lug or bracket 65. For purposes of maintaining the towing force at the proper height on the rack, the lug may be provided with a notch 105 at its leading corner, over which the hook 100 is engaged as shown particularly in FIG. 12.

Outwardly of the towing hook, and spaced therefrom by a distance corresponding to the lateral spacing between the conveyor chain 55 and the monorail 90, is a friction or slide pad 110 which is secured to the lower edge of the rack at the leading edge thereof, and preferably the trailing edge also, these edges extending transversely to the hook 100. A suitable slide or friction pad may be formed of a piece of plastic material, as shown in FIG. 13, which is fastened by bolts 112 and washers 113, or some equivalent means, to the main rack structure.

Thus, with the hook 100 engaged over a towing lug 65, the pad 110 rests on the monorail 90. In addition to the load support, this pad also provides some frictional resistance to movement of the outer portion of the rack, and thus the side of the rack to which the hook is fastened is automatically held in proper close relation to the upright portion of the towing lug of bracket 65, and the racks are therefore maintained in proper alignment to the conveyor chain 55 as they are transported about the machine. Furthermore, the lower edge of the rack, along its side to which the hook is attached, is urged into the supporting structure provided by the bracket or lug 65, and particularly its horizontal leg.

The racks thus are maintained in engagement with the towing lugs or brackets in such a way that when the drive lug is moved into the hook the frictional resistance to movement of the rack outward of the conveyor will maintain the engagement. However, it is easy to uncouple the racks from the conveyor merely by grasping a rack and sliding it ahead of the moving conveyor and outwardly, to accelerate the hook on the rack away from the towing lug or bracket 65. Therefore, with suitable provisions for supporting the rack for such sliding movement it is unnecessary for an operator to lift the dish carrying racks at any time, whether they are loaded or not, and the racks may be both engaged to and disengaged from the conveyor merely by sliding them into position.

Although a sliding support for this purpose can be provided anywhere on the main table 35 or either extension table 50 or 52, in a preferred construction of the machine the main table 35, including the scrapping basin 38, is covered by a relatively open gridwork 115 and 117. These gridwork parts preferably are formed as separate units to avoid the necessity of bridging the monorail 90, and may be formed as a plurality of inverted generally U-shaped rods 120 (applied to both gridworks) which are secured to cross rods 121 and carry adjustable feet 122. These feet in turn rest upon supporting brackets 124 which are provided as needed along the conveyor chain supporting rails, opposite sides of the monorail 90, and along the outer wall 37 of the table 35.

When the machine is to be used with the racks loaded somewhere other than on the machine, then these grids are placed in position over the table 35, and provide a support means on which the racks can be slid, substantially flush with the top of the monorail 90. The side of the rack having the hook thereon thus can be slid into the L-shaped receiving surface provided by a towing bracket 65. The racks, of course, can be so moved with relation to the moving conveyor that the hook 100 on the rack is ahead of the notch 105 formed in the leading edge of the towing bracket and the bracket thus will engage into the hook and carry the rack around the machine as previously described.

Since some thrust may be exerted in sliding the racks into engagement with the conveyor, a backup or thrust receiving extension rail 125 is mounted above the rearward conveying support rail 57, at such a height that the backup rail can be engaged by the rear side of the vertically extending leg of the towing brackets 65. The rail 125 preferably extends substantially the full length of the table 35, to provide sufficient support over the full length of the table for this purpose.

The drive for the conveyor chain 55 is provided as previously noted, through sprocket 75 which is mounted to mesh with the conveyor chain through the opening in the inner guide rails 57. This sprocket is secured to a vertical shaft 127 which is mounted in bearings 138 beneath the surface of the extension table 52. Shaft 127 also carries a larger lower sprocket 130, which is driven from an adjustable speed driving unit. This drive unit is mounted on angle supports 132 suspended beneath the extension table 52 by a number of legs 133 which are bolted or otherwise suitably secured to a depending flange 134 from the extension table (FIG. 7).

The drive unit is carried by a platform 135 which is adjustably mounted to the supporting angles 132 by means of bolts 136 which extend through elongated slots 137 in the platform, providing for movement of the entire drive unit to control the tension in the input drive chain 140. This chain is driven from an output sprocket 141 driven through a slip-clutch 142 from a gear-type speed reduction unit shown generally at 143, and suitably fastened to platform 135. Reduction unit 143 includes an input shaft 144 carrying a pulley 145, and this pulley is in turn driven through a belt 147 from an adjustable sheave 148 carried on the drive shaft of drive motor 150. The motor, in turn, is mounted for sliding movement on supporting rails 152 and its position on the rails is determined by a lead screw 153 which can be rotated by a hand wheel 154, and which is threaded into a follower nut 155 on the motor base.

Accordingly, turning the lead screw 153 will adjust motor 150 and its sheave 148 toward and away from the reduction unit 143 and its input pulley 145, thereby changing the effective diameter of the adjustable sheave and varying the speed at which pulley 145 is driven.

The conveyor drive may be continuous or not, depending upon the desired functioning of the machine. For example, if the machine is to be used in an installation where the dish carrying racks 95 are normally maintained in engagement with the drive conveyor, then it may be desirable to start and stop the conveyor to facilitate loading of soiled dishes into the rack and unloading of clean dishes. Thus, for example, the racks may be loaded with soiled dishes by waitresses or bus boys who carry the soiled dishes to the machine on trays, and these trays may be rested upon a supporting platform 160 which is mounted outwardly of and along the side table 35.

This tray support platform preferably includes a pair of outwardly extending brackets 162 joined by a reinforcing cross member 163, and each having inwardly horizontally projecting upper arms 164. These arms carry supporting bumpers 165 upon which the platform proper rests, with the downwardly projecting sides as shown in FIG. 3 which fit over the upper portion of the brackets 162. The forward or outer end of the arms 164 also carry bumpers 166, and around these bumpers are mounted springs 167 which normally bias the platform 160 slightly upward and out of contact with the bumpers 166.

A control switch 170 is mounted in vertically adjustable fashion on the cross member 163 and includes a projecting operator pin 172 which is so located as to be moved to operate the switch when sufficient weight is placed on platform 160 to overcome the springs 167 and lower the platform into contact with the bumpers 166. This switch 170 may be provided either as a normally closed switch which opens when the pin 172 is depressed, or vice versa, depending upon the desired functioning of the machine.

A suitable control circuit for the present machine is shown in FIG. 14, wherein the lines L1 and L2 represent a suitable source of electrical power. Line L1 is connected through a normally closed stop switch 175 and a normally open start switch 177 to an internal circuit supply line 178. These switches are manually operated and are housed in a control box 179 at the front of the table 35 in convenient reach of the operator.

Closing of start switch 177 completes a circuit through the coil of relay S1, closing its normally open contacts S1A, S1B, and S1C. With contacts S1B closed, a holding circuit is completed through line 180, through stop switch 175, to the line 178, and thus the power supply is maintained after the start switch 177 is released. Closing of contacts S1A completes a circuit through line 182 which includes the scrapper pump motor 16. In series with this circuit is an overload control 184 having normally closed contacts 185, which are in series with the coil of relay S1, and thus any overload in the scapper pump motor circuit will open these contacts, deenergize relay S1, and thus open the main supply to the entire circuit. Connected in parallel with the scrapper pump motor 16 is the solenoid 186 of a control valve 187 which is placed in the supply line 45 of the disposer, and will open only when solenoid 187 is energized. Thus, in normal operation of the machine, assuming that the food waste disposer 40 is to be used, when the machine is started water will be supplied therough pipe 45 and the aforementioned air gap, to flow through the supply tube and over the scrapping basin 38. The supply of water through line 45 will cause the normally open pressure responsive switch 190 to close energizing the disposer drive motor 42. If the disposer is not to be used, the normally closed manual switch 191 can be opened to break the circuit of motor 42, and this switch likewise can be opened to disconnect the disposer from power for any other reason.

At the same time, closing contacts S1C completes a circuit through line 192 which includes the main pump motor 22. This circuit also includes an overload responsive device 193 having normally closed contacts 194 in series with relay S1, and thus an overload in the pump motor circuit will also cause this relay to open.

The relay S2 has its energizing coil connected in a circuit line 195 which extends from line 178 to L2. The contacts S2A of this relay are connected in a series circuit line 197 which includes the conveyor motor 150, its overload responsive control 198, and the control solenoid of a valve 200 which is connected into the final rinse supply line 23. The normally closed contacts 202 of the overload responsive device 198 are in series with the coil of relay S2, and in addition this series circuit includes the switch 170 which is controlled by the platform 160, and a further safety switch 205 which is biased toward an open position, but maintained closed by a safety cover 207 which is normally mounted in contact with this switch and extends over the drive sprocket 75, as shown particularly in FIG. 2. Thus, it is required that the safety cover 207 be in place before the conveyor can run, and further, the conveyor control circuit is under the control of the platform operated switch 170.

As mentioned previously, switch 170 may be of the normally closed type, as shown in FIG. 14, which will open upon depression of its operating pin by placing a tray of soiled dishes on the platform 160, or the switch may be of the normally open type which will close in response to this function, as shown at 170a in FIG. 15. The type of switch to be used is dependent upon the particular application of the machine and the desired mode of operation.

For example, in an installation for a restaurant or the like where personnel may carry trays of soiled dishes directly to the machine, instead of loading the dishes into racks elsewhere, and where there may be a large volume of soiled dishes during peak hours of operation, the most economical type of operation may be provided by having the conveyor normally in motion, i.e., a switch 170 normally closed. Then, each time a tray is placed on platform 160 the conveyor will stop and the final rinse spray will be turned off, while the soiled dishes are scraped, if necessary, into the basin 38 and the soiled dishes loaded into a rack. Since the soiled dishes are carried to the machine on trays, the racks will be left engaged on the conveyor and will not be removed from the machine. Clean dishes will be removed from the racks in the area of the extension table 52.

In other instances, particularly where the soiled dishes may be scrapped elsewhere but still brought to the machine on trays or carts or the like, and the racks thus maintained on the conveyor, and where the operational requirements of the machine are such that loading is intermittent, it may be desirable to have switch 170a of the normally open type, as shown in FIG. 15, such that it is closed and the conveyor operates (and final rinse water flows) only when a tray or other container of soiled dishes is placed on the platform 160. This of course requires that the racks be loaded while moving, but the speed of the conveyor can be readily adjusted, as previously explained, to a rate which permits this to be accomplished. Therefore, with such an installation the operation of the conveyor and of the final rinse spray will be intermittent, dependent upon the load or supply of soiled dishes to the machine. Also, since the disposer may not be needed, it can be deenergized by closing a valve in its water supply upstream of the device 190.

The machine can also be operated with arrangements for loading and unloading the dish carrying racks elsewhere. In a typical installation a table and connecting bridge structure (not shown) will be provided on which racks such as rack 95 are loaded with soiled dishes. The operator can then slide the loaded rack over the connecting bridge, which may conveniently be engaged with the machine in the area of the platform 160, which is then removed, and with the grids 115 and 117 in place the loaded racks can slide directly over the table 15, and the hook on the rack engaged with a towing lug on the conveyor. The racks of cleansed dishes coming from the discharge end of the machine can be disengaged from the conveyor and slid off at any convenient location, for example in the area of the extension table 52. A further bridge structure or the like (not shown) can be arranged at this location to receive these racks, and preferably grids of the same type can be arranged over a portion of extension table 52 to provide sliding support for the racks as they are removed from the machine.

FIG. 16 shows a modified form of rack supporting grid in accordance with the invention. In this construction, the stationary grids 115 and 117 are replaced by individual hinge mounted grid members carried by each of the towing lugs 65, and thus these swingable grid members are carried about the closed circuit path by the conveyor. These grid members each include a main or outer rod 210 formed to have a relatively wide outer end, substantially wider than the corresponding towing lug 65, and having inwardly turned inner edges 212 which are received through small stationary bearing blocks or the like 213 carried by the horizontal leg of the lug or bracket 65. A reinforcing rod 214 preferably is fastened to the main rod 210 in a configuration such as shown, to provide substantial support for racks received on these individual grid members.

It will be noted that in their operative position, these grid members rest in sliding relation upon the rail 90, and they may be swung to an essentially vertical position, partially shown in dotted lines, as when it is desired to provide free access to the machine for cleaning, maintenance, or the like. Due to the sliding contact between these grid members and rail 90, it is preferable to provide the rods 210 and 214 with replaceable slide pads or the like 215, which may be of a suitable plastic material. Of course, in the use of such moving grids, the racks may not come into contact with rail 90, and if such is the case the pads 110 on the racks may be removed.

Since the platform 160 is removed, switch 170 is unnecessary in such an arrangement, and it may be bypassed to eliminate its control from the circuit and to maintain the conveyor and final rinse in operation whenever the machine is running, with the final rinse lever-operated valve controlling the final rinse spray as the racks pass the spraying members 27.

If desired, it is also possible to use the scrapping basin 38 and disposer 40 separately from the dishwashing machine. Thus, referring to FIG. 1, the supply pipe 220 is normally connected to a water line and branches into parallel lines 222 and 224. If the disposer is to be operated with the dishwashing machine, the valve 225 in line 222 is opened, supplying water to the solenoid valve 187, which thus provides the ultimate control of the water supply passing through the flow responsive control switch 190 to energize the disposer motor circuit. Line 224 bypasses the valve 187, and includes a manually operated valve 227 which may be opened when the disposer and scrapping basin are to be used alone, providing a water supply which is directed only through the flow responsive switch device 190 to activate the disposer motor. Control of power to the disposer motor 42 is then provided by the manually operated water valve 227, since opening or closing of this valve will produce a corresponding opening or closing of the flow responsive switch 190. Should it be desired to maintain the water flow without running the disposer, switch 191 can be opened to break the supply circuit to motor 42.

From the foregoing, it is apparent that the present invention provides a dishwashing apparatus which is versatile in its application and operation, and which may readily be adapted to use with dish carrying racks continually connected to the conveying system, or removed therefrom. With the racks maintained in the closed loop path of the machine, operation of the conveyor and of the fresh water final rinse spray can readily be controlled to accommodate the demand upon the machine.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. For use in a cleansing machine having aligned entrance and discharge openings through which articles are moved in one direction, a table supported along one side of said machine and having extensions to said entrance and discharge openings providing an endless horizontal path extending through said machine; the improvement comprising a continuous conveyor extending along said path, drive means for said conveyor, a plurality of open framework racks, towing lugs mounted on said conveyor at spaced locations along the length thereof and engaged with said racks to move said racks over said table and through said machine, means defining a loading station adjacent said path including a platform for supporting articles to be loaded in said racks, and a control means connected to said drive means and responsive to presence of articles on said platform to control the operation of said drive means.

2. For use in a cleansing machine having a housing provided with entrance and discharge openings, a plurality of open-mesh racks adapted to support articles for conveyance through said machine, a conveyor extending through said machine to one side of said housing, and drive means connected to motivate said conveyor in a direction to move said racks through the machine from the entrance to the discharge openings; the improvement comprising a rail extending through said machine in spaced parallel relation to said conveyor providing a support for said racks and with which the racks are maintained in contact during movement thereof through said machine, a hook member on one side of each said rack opening along said side, towing lugs mounted on said conveyor spaced along the length thereof and adapted to engage in a hook on a rack to provide the driving connection between said conveyor and each rack, and each said towing lug including an elongated bracket having a vertically extending part for engagement with a hook on a rack and a supporting structure on each said lug rearward of said vertically extending part with respect to the direction of movement of said conveyor adapted to engage a portion of the bottom and hook mounting side of a rack.

3. Apparatus as defined in claim 2 including a table supported along one side of said housing and extensions on said table to said entrance and discharge openings respectively, and wherein said rail extends over said table and said extensions as well as through said machine forming an endless horizontal path, and wherein said conveyor extends around said path in parallel spaced relationship to said rail.

4. For use in a cleansing machine including entrance and discharge openings through which articles are moved, a main table supported along one side of said machine, extension tables between said main table and said entrance and discharge openings providing a complete closed circuit for movement of article carrying racks in an endless horizontal path through said machine, and a plurality of open framework racks for carrying the articles; a continuous conveyor extending around said path and having a plurality of towing lugs mounted thereon at spaced locations along the length thereof for engagement with a rack placed to intercept a moving lug to tow said racks about said path, means for driving said conveyor in a direction to carry the racks through said machine from the entrance to the discharge openings, means defining a loading station for said machine along said path, and guide support means on said machine operative to guide racks maintained in sliding engagement therewith toward an intercepting position with respect to said lugs.

References Cited in the file of this patent

UNITED STATES PATENTS

| | | |
|---|---|---|
| 1,015,379 | Darting | Jan. 23, 1912 |
| 1,659,831 | Mudd | Feb. 21, 1928 |
| 1,934,494 | Gillespie | Nov. 7, 1933 |
| 2,067,838 | Girton | Jan. 12, 1937 |
| 2,073,521 | Johnston et al. | Mar. 9, 1937 |
| 2,116,430 | Gordon | May 3, 1938 |
| 2,199,747 | Long | May 7, 1940 |
| 2,299,618 | Finston | Oct. 20, 1942 |
| 2,345,355 | Neal | Mar. 28, 1944 |
| 2,619,097 | Von Bromssen | Nov. 25, 1952 |
| 2,649,100 | Frech | Aug. 18, 1953 |
| 2,949,120 | Federighi et al. | Aug. 16, 1960 |